US012733077B1

(12) United States Patent
Zhou

(10) Patent No.: US 12,733,077 B1
(45) Date of Patent: Sep. 8, 2026

(54) VOICE-CONTROLLED RECHARGEABLE PORTABLE OUTDOOR LIGHT

(71) Applicant: Beijing Huitong Hi-Tech Technology Co., Ltd., Beijing (CN)

(72) Inventor: Honghua Zhou, Beijing (CN)

(73) Assignee: Beijing Huitong Hi-Tech Technology Co., Ltd., Beijing (CN)

( * ) Notice: Subject to any disclaimer, the term of this patent is extended or adjusted under 35 U.S.C. 154(b) by 0 days.

(21) Appl. No.: 19/345,118

(22) Filed: Sep. 30, 2025

(30) Foreign Application Priority Data

Sep. 12, 2025 (CN) ......................... 202521973398.7

(51) Int. Cl.

| | |
|---|---|
| ***H05B 47/12*** | (2020.01) |
| ***F21L 4/04*** | (2006.01) |
| ***F21V 14/02*** | (2006.01) |
| ***F21V 21/08*** | (2006.01) |
| ***F21V 21/14*** | (2006.01) |
| ***F21V 23/02*** | (2006.01) |
| ***F21V 23/06*** | (2006.01) |
| ***F21V 33/00*** | (2006.01) |
| ***H05B 47/17*** | (2020.01) |

(Continued)

(52) U.S. Cl.

CPC ................ *H05B 47/12* (2020.01); *F21L 4/04* (2013.01); *F21V 14/025* (2013.01); *F21V 21/08* (2013.01); *F21V 21/145* (2013.01); *F21V 23/02* (2013.01); *F21V 23/06* (2013.01); *F21V 33/0056* (2013.01); *H05B 47/17* (2020.01); *H05B 47/197* (2024.01); *F21W 2131/10* (2013.01)

(58) Field of Classification Search

CPC ...... H05B 47/12; H05B 47/17; H05B 47/197; F21L 4/04; F21V 14/025; F21V 21/08; F21V 21/145; F21V 23/02; F21V 23/06

See application file for complete search history.

(56) References Cited

U.S. PATENT DOCUMENTS

| | | | | |
|---|---|---|---|---|
| 10,030,855 | B1 * | 7/2018 | Khubani | F21L 4/027 |
| D1,080,032 | S * | 6/2025 | Zhou | D26/102 |

(Continued)

OTHER PUBLICATIONS https://www.sakerplus.com/products/saker-upgraded-portable-camping-light-with-bracket; available Nov. 2024; accessed Mar. 2026 (Year: 2024).*

(Continued)

*Primary Examiner* — Leah Macchiarolo

(57) ABSTRACT

The present disclosure relates to a voice-controlled rechargeable portable outdoor light. The rechargeable portable outdoor light includes a housing, a power supply, and a light source, a microphone, a speaker, a voice control module and a processor which are arranged inside the housing and electrically connected to the power supply; the microphone is configured to receive a control voice and can generate an audio signal; and the voice control module is configured to receive the audio signal and generate a corresponding control signal and a corresponding broadcasting signal, the processor receives the control signal and controls light-emitting of the light source, and the speaker receives the broadcasting signal and broadcasts a corresponding audio frequency. A user can conveniently control, by voice, the outdoor light hung at height, and the outdoor light broadcasts a corresponding preset audio frequency while changing a light-emitting state of the light source.

11 Claims, 9 Drawing Sheets

(51) Int. Cl.
*H05B 47/175* (2020.01)
*F21W 131/10* (2006.01)

(56) References Cited

U.S. PATENT DOCUMENTS

| | | | | |
|---|---|---|---|---|
| 2005/0225971 | A1* | 10/2005 | Melnik | F21V 33/0052<br>362/202 |
| 2006/0154642 | A1* | 7/2006 | Scannell | F21S 6/002<br>455/404.1 |
| 2007/0171082 | A1* | 7/2007 | Melnik | F21L 4/005<br>340/574 |
| 2007/0259594 | A1* | 11/2007 | Galbiati | A63H 5/00<br>446/15 |
| 2015/0300581 | A1* | 10/2015 | Huang | H05B 47/1965<br>362/86 |
| 2016/0360585 | A1* | 12/2016 | Urry | F21V 23/0414 |
| 2018/0092230 | A1* | 3/2018 | Hsu | H01R 13/72 |
| 2019/0008018 | A1* | 1/2019 | Xie | G01C 17/10 |
| 2019/0063696 | A1* | 2/2019 | Grandadam | H05B 45/10 |
| 2019/0215926 | A1* | 7/2019 | Lay | F21L 4/08 |
| 2021/0172574 | A1* | 6/2021 | Grandadam | F21V 17/12 |
| 2021/0310642 | A1* | 10/2021 | Laliberte | F21V 33/0052 |

OTHER PUBLICATIONS https://kilosgear.com/products/rover-camping-light-x; available at least Mar. 2025 per the reviews; accessed Mar. 2026 (Year: 2025).*

* cited by examiner

| | Voice command words | Broadcasting statements |
|---|---|---|
| 1 | Hi-EYE-OH-DO(你好，EYE-OH-DO) | Hello (你好) |
| 2 | Hello-EYE-OH-DO(你好，EYE-OH-DO) | Hello (你好) |
| 3 | Hi-YA-OH-DO(你好，YA-OH-DO) | Hello (你好) |
| 4 | Hello-YA-OH-DO(你好，YA-OH-DO) | Hello (你好) |
| 5 | Hi-OH-DO(你好，OH-DO) | Hello (你好) |
| 6 | Hello-OH-DO(你好，OH-DO) | Hello (你好) |
| 7 | No voice input, wait for 30 seconds without operations | OK Goodbye (好的，再见) |
| 8 | No voice input, press button to enter voice mode | Hello,welcome to voice mode(你好，欢迎来到语音模式) |
| 9 | Turn-On-The-Light(开灯) | The light is on(灯已打开) |
| 10 | Switch-On-The-Light(开灯) | The light is on(灯已打开) |
| 11 | Turn-Off-The-Light(关灯) | OK Goodbye(好的，再见) |
| 12 | Switch-Off-The-Light(关灯) | OK Goodbye(好的，再见) |
| 13 | Brightness-The-Lights(灯光亮度) | Brightness adjusted(亮度调整) |
| 14 | Up-The-Brightness(提高亮度) | Brightness adjusted(亮度调整) |
| 15 | Max-Brightness(最大亮度) | Brightness adjusted(亮度调整) |
| 16 | Full-Brightness(最大亮度/全亮度) | Brightness adjusted(亮度调整) |
| 17 | Dim-The-Lights(降低亮度/暗亮度) | Brightness adjusted(亮度调整) |
| 18 | Lower-The-Lights((降低亮度)) | Brightness adjusted(亮度调整) |
| 19 | Warm-Lights-Mode(暖光模式) | Lights changed(灯光改变) |
| 20 | Go-To-Warm-Lights(切换暖光) | Lights changed(灯光改变) |
| 21 | White-Lights-Mode(白光模式) | Lights changed(灯光改变) |
| 22 | Go-To-White-Lights(切换白光) | Lights changed(灯光改变) |
| 23 | Nature-Lights-Mode(自然光模式) | Lights changed(灯光改变) |
| 24 | Go-To-Nature-Lights(切换自然光) | Lights changed(灯光改变) |
| 25 | SOS-Mode(SOS 模式) | Lights changed(灯光改变) |
| 26 | Warning-Mode(暖光模式) | Lights changed(灯光改变) |
| 27 | Louder-Please(增大音量) | Volume changed(音量改变) |
| 28 | Volume-Up(增大音量) | Volume changed(音量改变) |
| 29 | Max-Volume(最大音量) | Volume changed(音量改变) |
| 30 | Full-Volume(最大音量/全音量) | Volume changed(音量改变) |
| 31 | Make-It-Quieter(降低音量) | Volume changed(音量改变) |
| 32 | Volume-Down(降低音量) | Volume changed(音量改变) |

FIG. 6

VOICE-CONTROLLED RECHARGEABLE PORTABLE OUTDOOR LIGHT

CROSS-REFERENCE TO RELATED APPLICATIONS

The application claims priority of Chinese patent application CN202521973398.7, filed on Sep. 12, 2025, which is incorporated herein by reference in its entireties.

TECHNICAL FIELD

The present disclosure relates to the technical field of outdoor lights, in particular to a voice-controlled rechargeable portable outdoor light.

BACKGROUND

Outdoor lights are lights mainly used for outdoor lighting. There are various outdoor lights, including street lamps, lawn lights, and hand lanterns used by outdoor users.

The portable outdoor lights are increasingly popular among consumers due to the small size and easiness in carrying. When using the portable outdoor light, a user can press buttons to control turning-on/off of the light and adjust the brightness. However, during activities such as camping, the user needs to hang the portable outdoor light at height to use the light as a fixed lighting light source. Therefore, the buttons of the portable outdoor light are difficult to press, and the operation is inconvenient.

SUMMARY

The present disclosure aims to provide a voice-controlled rechargeable portable outdoor light, so as to solve the technical problems that when a traditional portable outdoor light is used during activities such as camping, a user needs to hang the portable outdoor light at height to use the light as a fixed lighting light source, and therefore buttons of the portable outdoor light are difficult to press, and the operation is inconvenient.

To solve the above technical problems, the present disclosure adopts the following technical solutions:

a voice-controlled rechargeable portable outdoor light, including a housing, a power supply, and a light source, a microphone, a speaker, a voice control module and a processor which are arranged inside the housing and electrically connected to the power supply, where the microphone is configured to receive a control voice and is capable of generating an audio signal;

the voice control module is configured to receive the audio signal and generate a corresponding control signal and a corresponding broadcasting signal, an enable end of the voice control module is electrically connected to the microphone, and an output end of the voice control module is electrically connected to the speaker;

the processor is electrically connected to the light source and is configured to control a light-emitting state of the light source;

when the voice control module receives the audio signal, the voice control module generates the corresponding control signal and the corresponding broadcasting signal, the processor receives the control signal and controls light-emitting of the light source, and the speaker receives the broadcasting signal and broadcasts a corresponding audio frequency; and the power supply is capable of being externally connected to an electronic device and supplying power to the electronic device.

Further, the voice control module includes a voltage conversion circuit, a voice control circuit, a pickup circuit and an audio amplification circuit, the voltage conversion circuit is electrically connected to the power supply, an enable end of the pickup circuit is electrically connected to the microphone, and an output end of the audio amplification circuit is electrically connected to the speaker.

Further, the voltage conversion circuit adopts a chip model of ME2107A50M5G, the voice control circuit adopts a chip model of JTW93310, and the audio amplification circuit adopts a chip model of 8002D.

Further, the control voice includes:

an on/off control voice for controlling turning-on and turning-off of the light source; and/or a brightness control voice for controlling brightness of the light source; and/or a color temperature control voice for controlling a color temperature of the light source; and/or a volume control voice for controlling a broadcasting volume of the speaker.

Further, the control voice includes an SOS control voice for controlling the light source to emit an SOS light effect.

Further, the rechargeable portable outdoor light further includes a connecting structure, where at least part of the connecting structure is exposed out of the housing.

Further, the connecting structure is a hook, and the hook is rotationally connected to the housing such that the hook is capable of switching between an open state and a storage state; and a hook groove is formed in an outer wall of the housing, and when the hook is in the storage state, the hook is located inside the hook groove and does not protrude out of an outer surface of the housing.

Further, the connecting structure includes hooking shafts for hooking, and two hooking shafts are provided and are arranged at two opposite ends of the housing.

Further, the housing includes a main body, a connector and a light shell, the light shell is connected to the end of the connector away from the main body, the light source is arranged inside the light shell, a connecting portion of the connector is rotationally connected to the main body, and the connector is capable of rotating around an axial direction of the connecting portion so as to drive the light shell to rotate.

Further, the light shell is rotationally connected to the side of the connector away from the main body, and the light shell is capable of swinging in a pitching manner relative to the connector so as to adjust an illumination angle.

It can be seen from the above technical solutions that the embodiments of the present disclosure at least have the following advantages and positive effects:

according to the voice-controlled rechargeable portable outdoor light in the embodiments of the present disclosure, the user can conveniently control, by voice, the rechargeable portable outdoor light hung at height, and the rechargeable portable outdoor light broadcasts the corresponding preset audio frequency while changing the light-emitting state of the light source, thereby reminding the controller or other users of the change of the light state, and preventing falling of the users due to changes of the light such as sudden dimming; besides, the rechargeable portable outdoor light can also serve as a power bank to supply power to other electronic devices.

BRIEF DESCRIPTION OF THE DRAWINGS

In order to explain the technical solutions in embodiments of the present disclosure or the prior art more clearly, drawings needed in descriptions of the embodiments or the prior art will be briefly introduced below.

FIG. 6 is a table of control voices and broadcasting statements as shown in FIG. 1;

Figure 1:
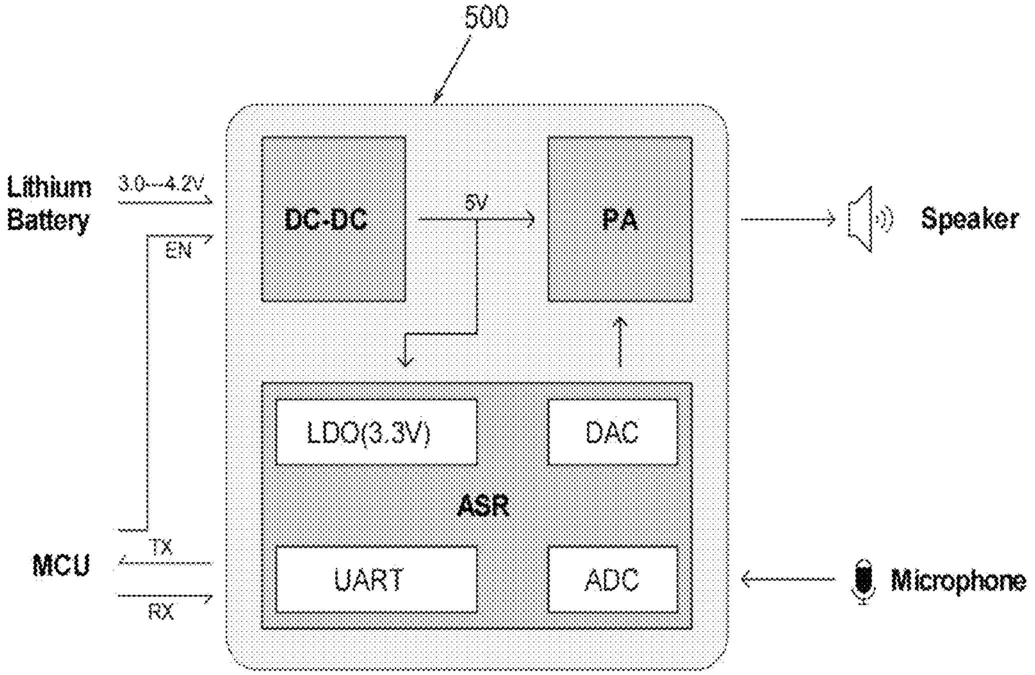
FIG. 1 is a schematic block diagram of a voice-controlled rechargeable portable outdoor light in an embodiment of the present disclosure.

The description of reference numerals is as follows:

10. rechargeable portable outdoor light; 100. housing; 110. main body; 111. groove; 120. connector; 121. connecting portion; 122. bump; 130. light shell; 200. light source; 300. microphone; 400. speaker; 500. voice control module; 510. voltage conversion chip; 520. voice control chip; 530. audio amplification chip; 600. power supply; 700. circuit board; 800. electrical interface; 900. connecting structure; 910. hook; 920. hook groove; 930. hooking shaft; and 940. support member.

DETAILED DESCRIPTION OF EMBODIMENTS

Exemplary embodiments that embody the features and advantages of the present disclosure will be described in detail in the following description. It will be appreciated that the present disclosure may have various changes in different embodiments without departing from the scope of the present disclosure, and that the description and drawings are illustrative in nature and are not intended to limit the present disclosure.

In addition, the terms "first" and "second" are merely used for descriptive purposes and cannot be construed as indicating or implying relative importance or implicitly specifying the number of indicated technical features. Thus, the features defined as "first" and "second" may explicitly or implicitly include one or more such features. In the description of the present application, "a plurality of" means two or more, unless expressly specified otherwise.

In the description of the present application, it should be noted that unless otherwise specified and defined, the terms "mounting", "connecting" and "connection" should be understood in a broad sense, for example, "mounting", "connecting" and "connection" can be either fixed connection or detachable connection or integrated connection; can be either mechanical connection or electric connection; and can be either direct connection or indirect connection via an intermediation or internal communication of two components. The specific meanings of the above terms in the present application may be understood by those of ordinary skill in the art according to specific circumstances.

First, some of the terms in FIG. 1 are explained as follows:

Lithium Battery: lithium battery (power supply); EN: enable end; DC-DC: DC-DC converter (voltage conversion circuit); PA: audio amplification circuit; Speaker: loudspeaker (speaker); LDO: low-dropout regulator; DAC: digital-to-analog converter; MCU: microcontroller unit; TX/RX: transmit/receive; UART: universal asynchronous receiver-transmitter; ASR: automatic speech recognition; ADC: analog-to-digital converter; Microphone: microphone.

Figure 7:
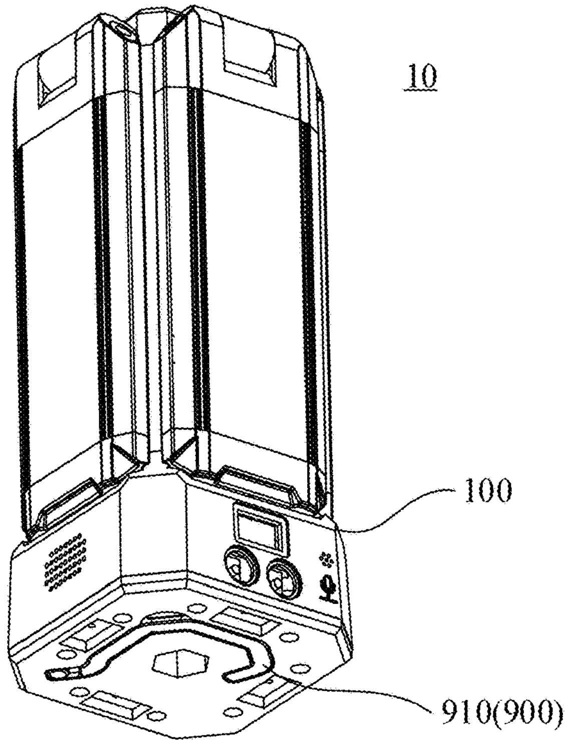
FIG. 7 is an overall structural schematic diagram of a rechargeable portable outdoor light in the first embodiment.

With reference to FIG. 1, FIG. 6 and FIG. 7, the present disclosure provides a voice-controlled rechargeable portable outdoor light 10. A user can hold the rechargeable portable outdoor light 10 outdoors to illuminate the surroundings, and during activities such as camping, the user can also hang the rechargeable portable outdoor light 10 at height to use the light as a fixed lighting light source 200.

The rechargeable portable outdoor light 10 includes a housing 100, and a microphone 300, a speaker 400, a voice control module 500 and a processor which are located inside the housing 100. The microphone 300 is configured to receive a control voice and is capable of generating a corresponding audio signal; the voice control module 500 is configured to receive the audio signal and generate a corresponding control signal and a corresponding broadcasting signal, an enable end of the voice control module 500 is electrically connected to the microphone 300, and an output end of the voice control module 500 is electrically connected to the speaker 400; and the processor is electrically connected to the light source 200 and is configured to control a light-emitting state of the light source 200.

When the voice control module 500 receives the audio signal, the voice control module 500 generates the corresponding control signal and the corresponding broadcasting signal, the processor receives the control signal and controls light-emitting of the light source 200, and the speaker 400 receives the broadcasting signal and broadcasts a corresponding audio frequency.

It can be understood that the control voice can be either the voice made by the user or the voice generated by an electronic device such as a mobile phone.

It can be understood that the processor is an MCU such as single-chip microcomputer, and the processor can be either an individual electronic component or a functional module on an integrated circuit.

It can be understood that the light source 200 can be any existing light source 200 on the market, such as an LED and an incandescent light bulb.

In the embodiments of the present disclosure, the user can conveniently control, by voice, the rechargeable portable outdoor light 10 hung at height, and the portable outdoor light broadcasts the corresponding preset audio frequency while changing the light-emitting state of the light source 200, thereby reminding the controller or other users of the change of the light state, and preventing falling of the users due to changes of the light such as sudden dimming.

Figure 2:
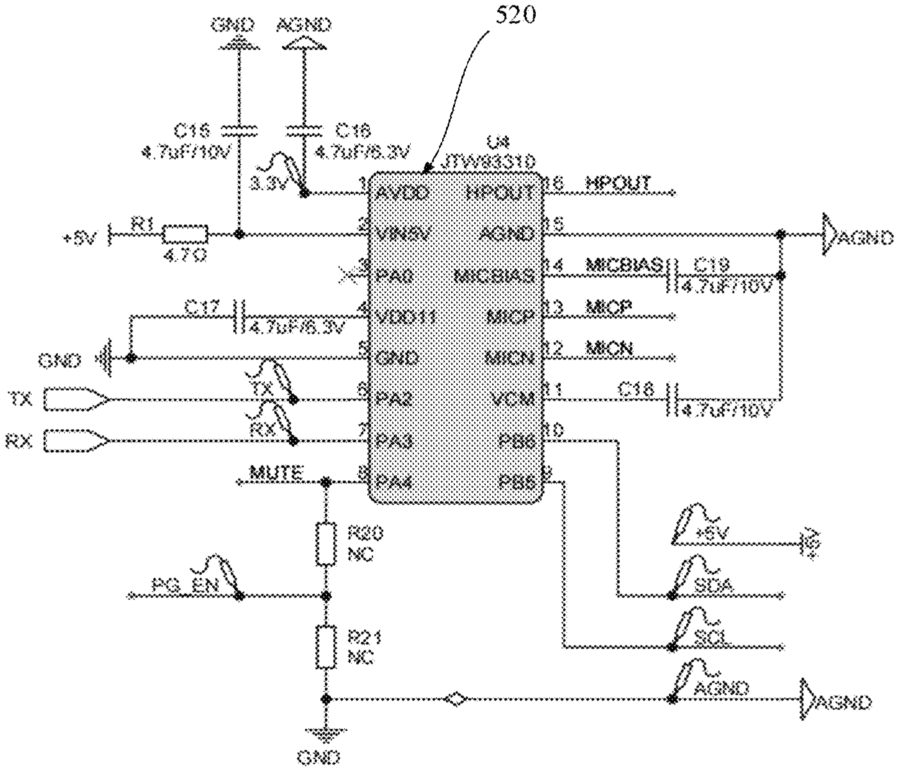
FIG. 2 is a schematic circuit diagram of a voice control module as shown in FIG. 1.
Figure 3:
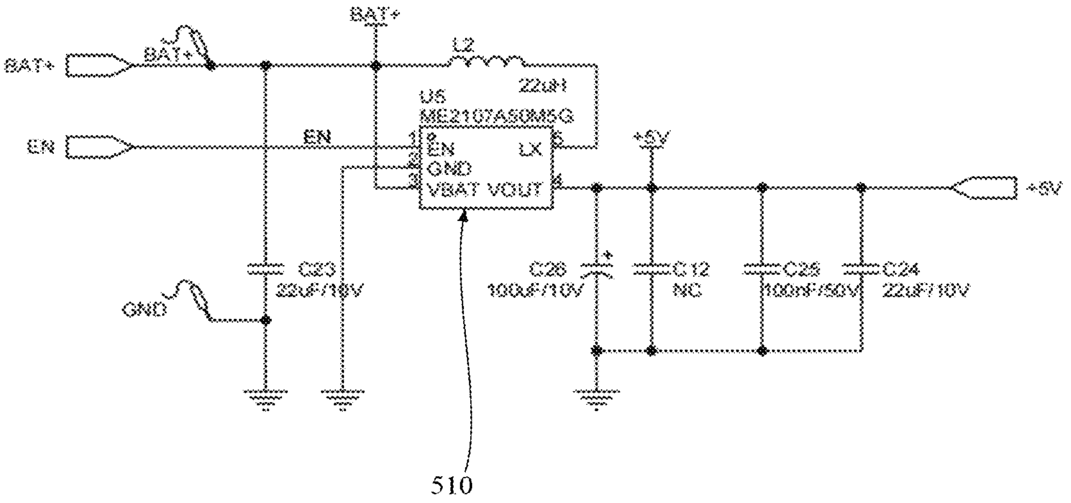
FIG. 3 is a schematic diagram of a voltage conversion circuit as shown in FIG. 1.
Figure 4:
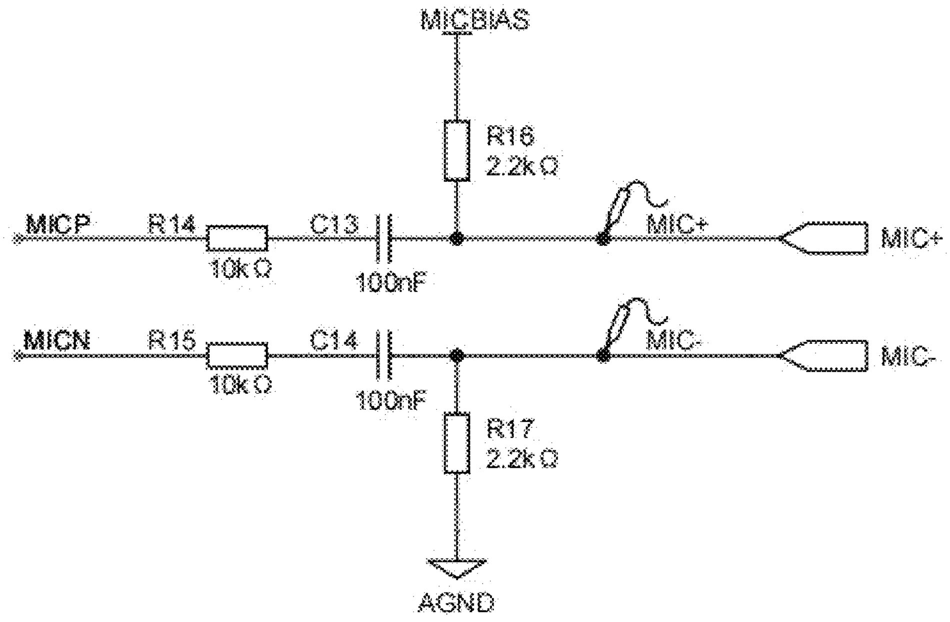
FIG. 4 is a schematic diagram of a pickup circuit as shown in FIG. 1.
Figure 5:
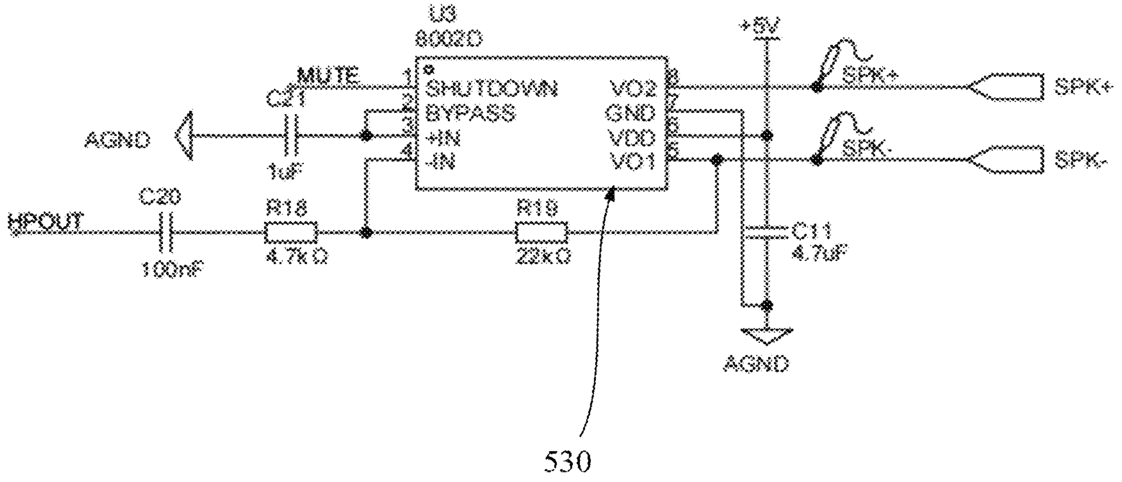
FIG. 5 is a schematic diagram of an audio amplification circuit as shown in FIG. 1.

With reference to FIG. 1 to FIG. 5, the voice control module 500 as shown in FIG. 1 includes a voice control circuit as shown in FIG. 2, a voltage conversion circuit as shown in FIG. 3, a pickup circuit as shown in FIG. 4 and an audio amplification circuit as shown in FIG. 5, the voltage conversion circuit is electrically connected to a power supply 600, an enable end of the pickup circuit is electrically connected to the microphone 300, and an output end of the audio amplification circuit is electrically connected to the speaker 400.

Besides, FIG. 1 shows that the voice control module 500 further includes functional modules such as an LDO, a UART, a DAC, an ADC and an ASR module.

The LDO provides a stable 3.3V power supply and supplies power to sensitive components such as the UART, the DAC, the ADC and the ASR module. The processor achieves communication through the UART, the ADC converts an analog signal of the microphone 300 into a digital signal which is processed by the ASR module, and the DAC converts a digital audio signal into an analog signal which is broadcast by the loudspeaker (speaker 400).

Specifically, FIG. 2 shows that the chip model of the voice control circuit is JTW93310, and a voice control chip 520 includes sixteen pins numbered 1 to 16. FIG. 3 shows that the chip model of the voltage conversion circuit is ME2107A50M5G, and a voltage conversion chip 510 includes five pins numbered 1 to 5. FIG. 4 shows the audio amplification circuit, the chip model of the audio amplification circuit is 8002D, and an audio amplification chip 530 includes eight pins numbered 1 to 8.

The voltage conversion circuit as shown in FIG. 3 boosts an input voltage of 3.0-4.2 V of the lithium battery and stably outputs a stable voltage of 5 V, the pin 1 of the voltage conversion chip 510 is an enable end, the pin 2 is grounded, the pin 3 is a power supply input and is connected to the lithium battery, and the pin 4 is an output end and provides the voltage of 5 V.

The voice control circuit receives the audio signal from the pickup circuit, processes the audio signal and then generates the control signal which is transmitted to the processor to control the light-emitting of the light source 200, and also generates the broadcasting signal which is transmitted by the audio amplification circuit to the speaker 400 to broadcast a corresponding audio frequency.

The pin 2 of the voice control chip 520 is connected to the pin 4 of the voltage conversion chip 510 so as to obtain the voltage of 5 V, the pin 6 and the pin 7 of the voice control chip 520 are respectively connected to the processor so as to transmit the control signal, the pin 12, the pin 13 and the pin 14 of the voice control chip 520 are respectively and correspondingly connected to the pickup circuit so as to receive the audio signal from the pickup circuit, and the pin 16 of the voice control chip 520 is connected to the pin 4 of the audio amplification chip 530 so as to transmit the broadcasting signal.

The audio amplification circuit as shown in FIG. 5 plays a role in amplifying audio power, and the pin 5 and the pin 8 of the audio amplification chip 530 are respectively connected to positive and negative terminals of the loudspeaker, thereby driving the loudspeaker.

With reference to FIG. 6, the control voice includes an on/off control voice, a brightness control voice, a color temperature control voice, a volume control voice and an SOS control voice. Specifically, the on/off control voice is used for controlling turning-on and turning-off of the light source 200, for example, control voices numbered 9 to 12 in FIG. 6; the brightness control voice is used for controlling brightness of the light source 200, for example, control voices numbered 13 to 18 in FIG. 6; the color temperature control voice is used for controlling a color temperature of the light source 200, for example, control voices numbered 19 to 24 and 26 in FIG. 6; the volume control voice is used for controlling a broadcasting volume of the speaker 400, for example, control voices numbered 27 to 32 in FIG. 6; and the SOS control voice is used for controlling the light source 200 to emit an SOS light effect, for example, a control voice numbered 25 in FIG. 6, and the SOS light effect can include three short flashes (three quick flashes), three long flashes (three prolonged flashes) and then three short flashes again, thereby forming the "short-long-short" SOS signal.

It can be understood that FIG. 6 only exemplarily describes command words and broadcasting statements in Chinese and English. In other embodiments, manufacturers can amend the specific statements according to requirements, or translate them into languages such as Japanese or German.

Figure 9:
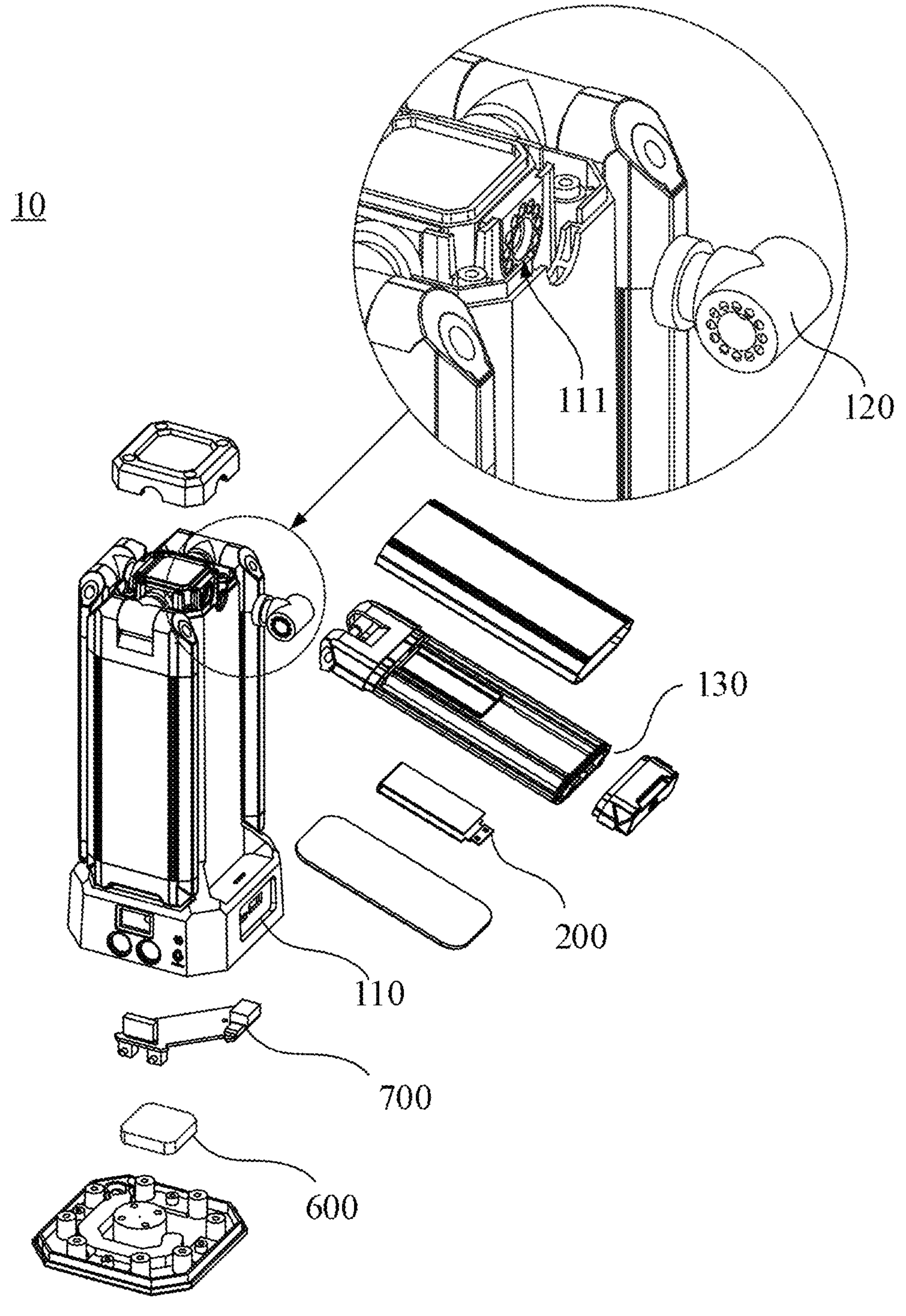
FIG. 9 is an exploded structural diagram of the rechargeable portable outdoor light as shown in FIG. 7.

With reference to FIG. 9, specifically, the rechargeable portable outdoor light 10 further includes the power supply 600, the power supply 600 is arranged inside the housing 100, and the power supply 600 is electrically connected to a circuit board 700 and the light source 200 inside the housing 100 to supply power thereto. Besides, the power supply 600 can also be externally connected to an electronic device and supply power to the electronic device, and then the rechargeable portable outdoor light 10 can be used as a power bank.

Specifically, the housing 100 is provided with a plurality of electrical interfaces 800 electrically connected to the circuit board 700, and the electrical interfaces 800 can be a charge/discharge interface, a TYPE-C interface, etc.

With reference to FIG. 7 to FIG. 15, the rechargeable portable outdoor light 10 further includes a connecting structure 900, where at least part of the connecting structure 900 is exposed out of the housing 100 such that the user can conveniently connect the rechargeable portable outdoor light 10 at height or to other places.

Figure 13:
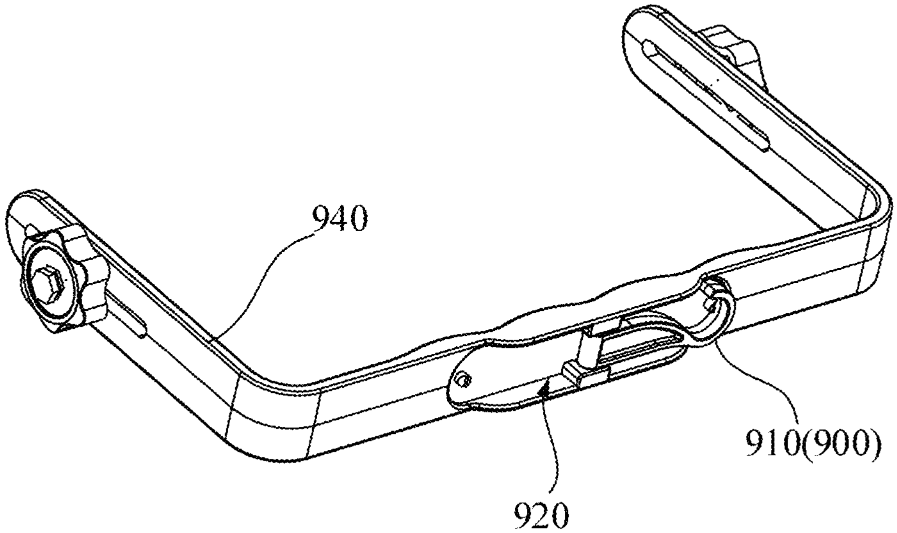
FIG. 13 is an enlarged structural diagram of a support member in FIG. 12.
Figure 15:
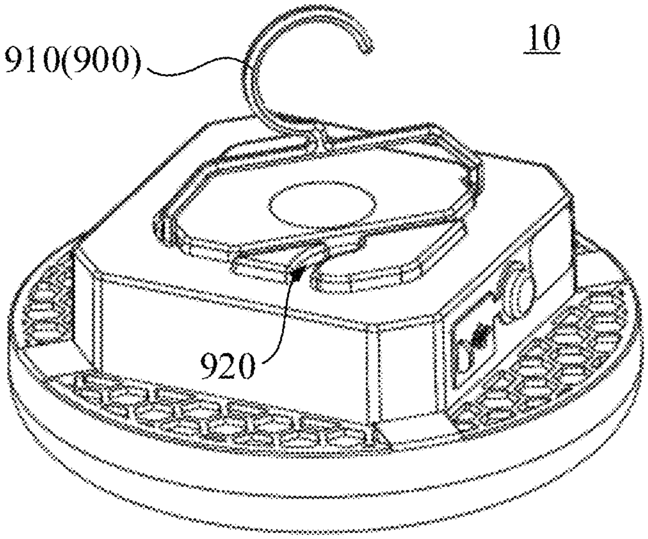
FIG. 15 is an overall structural schematic diagram of a rechargeable portable outdoor light in the fourth embodiment.

With reference to FIG. 7, FIG. 13 and FIG. 15, specifically, in some embodiments, the connecting structure 900 is a hook 910, and the hook 910 is rotationally connected to the housing 100 such that the hook 910 is capable of switching between an open state and a storage state. A hook groove 920 is formed in an outer wall of the housing 100, and when the hook 910 is in the storage state, the hook 910 is located inside the hook groove 920 and does not protrude out of an outer surface of the housing 100.

Through such arrangement, the rechargeable portable outdoor light 10 can be conveniently stored, and the hook 910 is prevented from colliding with other objects or a human body when not in use.

Figure 14:
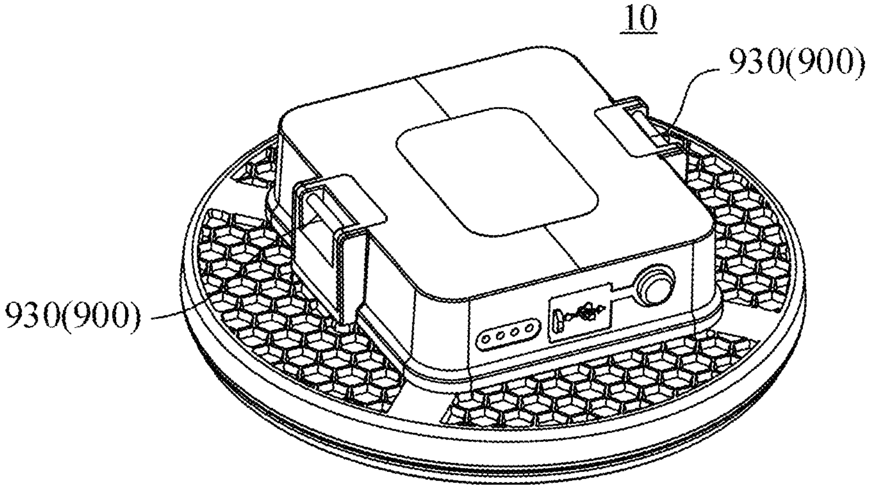
FIG. 14 is an overall structural schematic diagram of a rechargeable portable outdoor light in the third embodiment.

With reference to FIG. 14, specifically, in some embodiments, the connecting structure 900 includes hooking shafts 930 for hooking, two hooking shafts 930 are provided and are arranged at two opposite ends of the housing 100, and the user can fasten the hooking shafts 930 by using elongated objects such as strings, so as to fix the rechargeable portable outdoor light 10.

Figure 8:
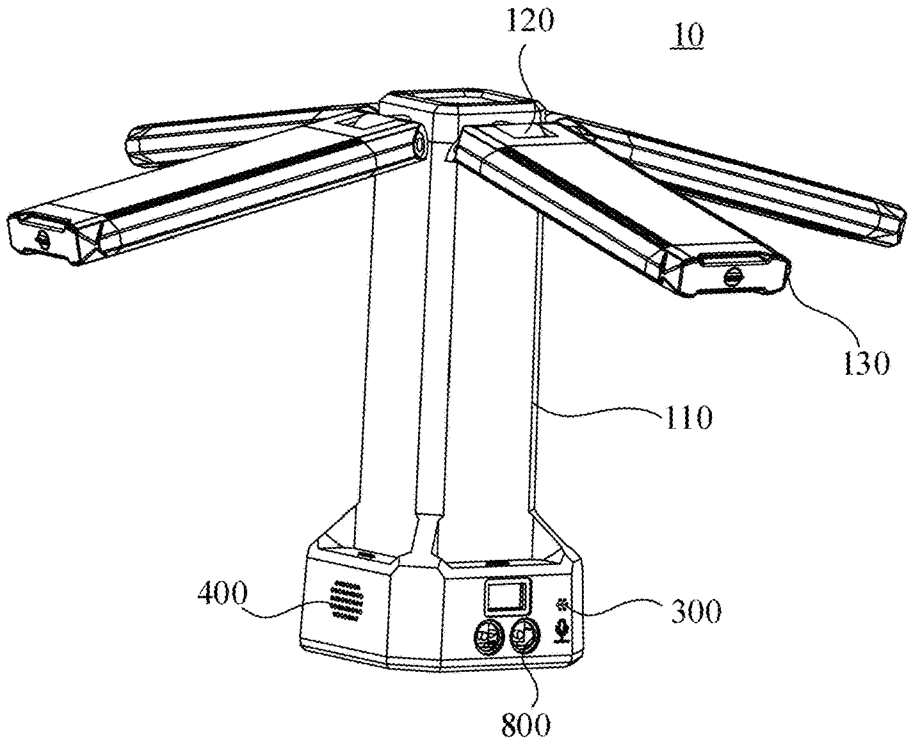
FIG. 8 is an expanded view of the rechargeable portable outdoor light as shown in FIG. 7.

With reference to FIG. 7 to FIG. 10, in an embodiment, the housing 100 includes a main body 110, a connector 120 and a light shell 130, the light shell 130 is connected to the end of the connector 120 away from the main body 110, the light source 200 is arranged inside the light shell 130, a connecting portion 121 of the connector 120 is rotationally connected to the main body 110, the connector 120 is capable of rotating around an axial direction of the connecting portion 121 so as to drive the light shell 130 to rotate to adjust the angle of the light source 200, and then the rechargeable portable outdoor light 10 switches to the display form as shown in FIG. 8.

Specifically, FIG. 9 shows that the light shell 130 is rotationally connected to the side of the connector 120 away from the main body 110, and the light shell 130 is capable of swinging in a pitching manner relative to the connector 120 so as to adjust an illumination angle. Through such arrangement, the light source 200 can have the larger angle adjustment space.

Figure 10:
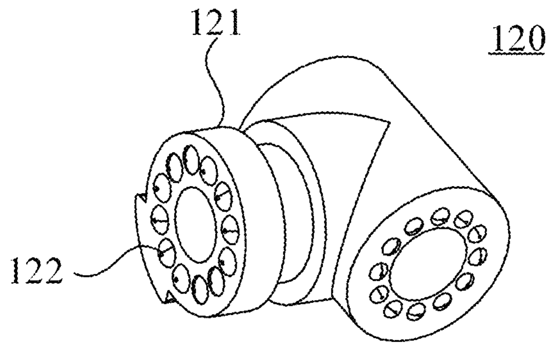
FIG. 10 is an enlarged structural diagram of a connector as shown in FIG. 9.

With reference to FIG. 9 and FIG. 10, further, a plurality of hemispherical bumps 122 spaced apart in the circumferential direction of the connecting portion are arranged on the side of the connecting portion 121 close to the main body 110, a plurality of hemispherical grooves 111 adapted to the bumps 122 are formed in the side of the main body 110 close to the connecting portion 121, and when the connecting portion 121 rotates relative to the main body 110, each bump 122 slides from one groove 111 to another groove 111 to achieve mechanical self-locking, so that the light angle is kept relatively stable after being adjusted, and shaking is avoided. Besides, self-locking between the connecting portion 121 and the light shell 130 is also achieved in the same connection manner, which is not repeated here.

Figure 11:
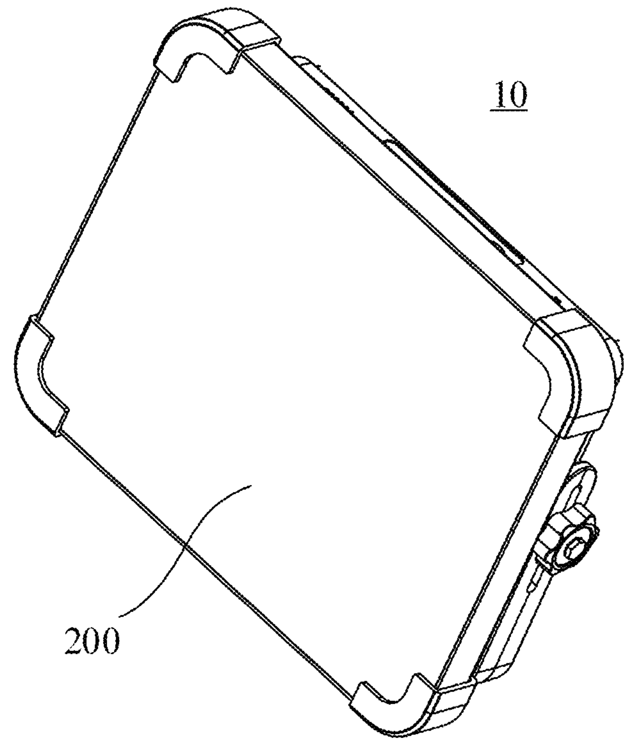
FIG. 11 is an overall structural schematic diagram of a rechargeable portable outdoor light in the second embodiment.
Figure 12:
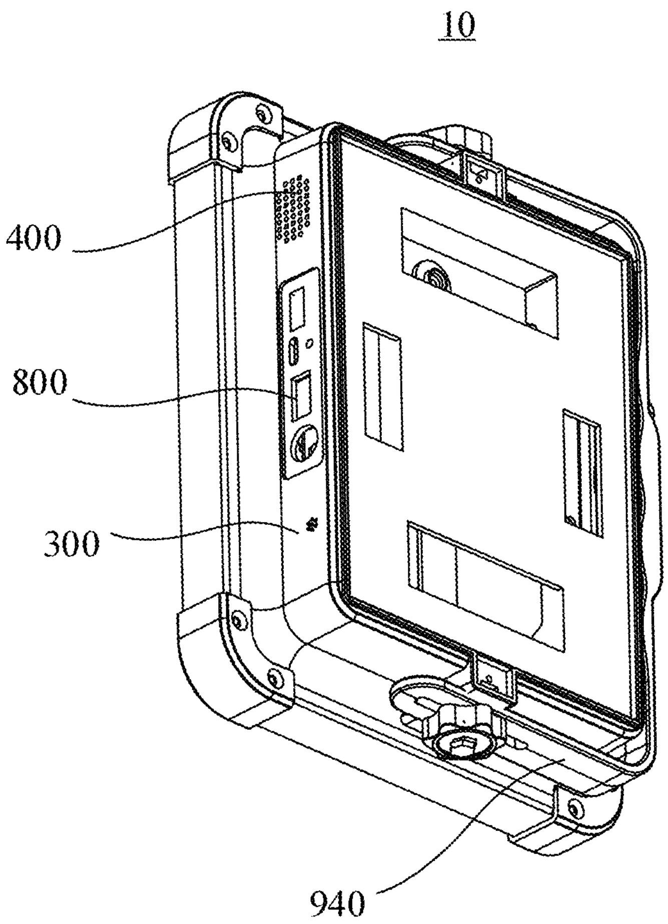
FIG. 12 is a rear view of the rechargeable portable outdoor light as shown in FIG. 11.

With reference to FIG. 11 to FIG. 13, in an embodiment, the rechargeable portable outdoor light 10 further includes a support member 940, the support member 940 is rotationally connected to the housing 100, and the support member 940 is capable of being opened relative to the housing 100 such that the rechargeable portable outdoor light 10 can be supported on a plane. In this embodiment, the support member 940 is in a U shape, and a manufacturer can adjust the shape of the support member 940 according to requirements.

Specifically, the hook 910 is arranged on the support member 940, the hook 910 is rotationally connected to the support member 940, and the support member 940 is provided with the corresponding hook groove 920.

Although the present disclosure has been described with reference to several typical embodiments, it should be understood that the terms used are illustrative and exemplary terms rather than restrictive terms. As the present disclosure can be implemented specifically in various forms without departing from spirit or essence of the present disclosure, it should be understood that the embodiments are not limited to any above-mentioned details but should be explained extensively in the spirit and scope of the attached claims, and therefore, all variations and modifications falling within the claims or equivalent ranges thereof should be covered by the attached claims.

The invention claimed is:

1. A voice-controlled rechargeable portable outdoor light, comprising a housing, a power supply, and a light source, a microphone, a speaker, a voice control module and a processor which are arranged inside the housing and electrically connected to the power supply, wherein the microphone is configured to receive a control voice and is capable of generating an audio signal;

the voice control module is configured to receive the audio signal and generate a corresponding control signal and a corresponding broadcasting signal, an enable end of the voice control module is electrically connected to the microphone, and an output end of the voice control module is electrically connected to the speaker;

the processor is electrically connected to the light source and is configured to control a light-emitting state of the light source;

wherein the voice control module is configured to, upon receiving the audio signal, generate the corresponding control signal and the corresponding broadcasting signal, the processor is configured to receive the control signal and control light-emitting of the light source, and the speaker is configured to receive the broadcasting signal and broadcast a corresponding audio frequency that indicates a change of the light-emitting state of the light source; and the power supply is capable of being connected to an external electronic device and supplying power to the external electronic device, such that the rechargeable portable outdoor light is operable as a power bank;

wherein the housing comprises a main body and a connector, a connecting portion of the connector is rotationally connected to the main body; a plurality of hemispherical bumps spaced apart in a circumferential direction are arranged on a side, of the connecting portion, facing the main body; a plurality of hemispherical grooves adapted to the bumps are formed in a side, of the main body, facing the connecting portion; each hemispherical bump is configured to slide from one hemispherical groove to another hemispherical groove to achieve mechanical self-locking.

2. The rechargeable portable outdoor light according to claim 1, wherein the voice control module comprises a voltage conversion circuit, a voice control circuit, a pickup circuit and an audio amplification circuit, the voltage conversion circuit is electrically connected to the power supply, an enable end of the pickup circuit is electrically connected to the microphone, and an output end of the audio amplification circuit is electrically connected to the speaker.

3. The rechargeable portable outdoor light according to claim 2, wherein the voltage conversion circuit adopts a chip model of ME2107A50M5G, the voice control circuit adopts a chip model of JTW93310, and the audio amplification circuit adopts a chip model of 8002D.

4. The rechargeable portable outdoor light according to claim 1, wherein the control voice comprises:

an on/off control voice for controlling turning-on and turning-off of the light source; and/or a brightness control voice for controlling brightness of the light source; and/or a color temperature control voice for controlling a color temperature of the light source; and/or a volume control voice for controlling a broadcasting volume of the speaker.

5. The rechargeable portable outdoor light according to claim 1, wherein the control voice comprises an SOS control voice for controlling the light source to emit an SOS light effect.

6. The rechargeable portable outdoor light according to claim 1, further comprising a connecting structure, wherein at least part of the connecting structure is exposed out of the housing.

7. The rechargeable portable outdoor light according to claim 6, wherein the connecting structure is a hook, and the hook is rotationally connected to the housing such that the hook is capable of switching between an open state and a storage state; and a hook groove is formed in an outer wall of the housing, and when the hook is in the storage state, the hook is located inside the hook groove and does not protrude out of an outer surface of the housing.

8. The rechargeable portable outdoor light according to claim 7, further comprising a U-shaped support member rotationally connected to the housing, wherein the U-shaped support member is configured to be opened relative to the housing such that the rechargeable portable outdoor light is capable of being supported on a plane, the hook groove is arranged on the U-shaped support member, the hook is rotationally connected in the hook groove.

9. The rechargeable portable outdoor light according to claim 6, wherein the connecting structure comprises hooking shafts for hooking, and two hooking shafts are provided and are arranged at two opposite ends of the housing.

10. The rechargeable portable outdoor light according to claim 9, wherein the housing comprises a light shell, the light shell is connected to the end of the connector away from the main body, the light source is arranged inside the light shell, and the connector is capable of rotating around an axial direction of the connecting portion so as to drive the light shell to rotate.

11. The rechargeable portable outdoor light according to claim 10, wherein the light shell is rotationally connected to the side of the connector away from the main body, and the light shell is capable of swinging in a pitching manner relative to the connector so as to adjust an illumination angle.

* * * * *